United States Patent [19]

Yang

[11] 4,193,388
[45] Mar. 18, 1980

[54] PORTABLE HEATABLE CONTAINER

[76] Inventor: Robert A. Frosch, Administrator of the National Aeronautics and Space Administration, with respect to an invention of Lien C. Yang, La Canada, Calif.

[21] Appl. No.: 897,831

[22] Filed: Apr. 19, 1978

[51] Int. Cl.² ............................................. F24J 1/00
[52] U.S. Cl. ..................................... 126/263; 149/15; 149/37; 220/429
[58] Field of Search ................. 126/263, 262; 149/15, 149/37, 40; 102/90; 426/113, 521; 220/3.1, 426, 429, 444, 451; 422/1

[56] References Cited

U.S. PATENT DOCUMENTS

| 2,531,548 | 11/1950 | Bennett | 149/15 |
| 2,606,547 | 8/1952 | Stofel | 126/262 |
| 2,683,449 | 7/1954 | Katz | 126/263 |

Primary Examiner—Carroll B. Dority, Jr.
Assistant Examiner—Lee E. Barrett
Attorney, Agent, or Firm—Monte F. Mott; John R. Manning; Wilfred Grifka

[57] ABSTRACT

A container is provided which can be designed to heat its outer surface as to sterilize it, or to heat its inner surface and any contents therewithin. In a container that self sterilizes its outer surface, the container includes a combustible layer of thermit-type pyrotechnic material which can be ignited to generate considerable heat, and a thin casing around the combustible layer which is of highly thermally conductive materials such as aluminum which can be heated to a high temperature by the ignited combustible layer. A buffer layer which may be of metal, lies within the combustible layer, and a layer of insulation such as Teflon lies within the buffer layer to insulate the contents of the container from the heat. The thicknesses of the thermit-type charge of the combustible layer and of the casing are chosen so that the amount of heat from the charge heats the casing to a temperature which is only moderately high to avoid melting the casing.

2 Claims, 4 Drawing Figures

U.S. Patent    Mar. 18, 1980    4,193,388
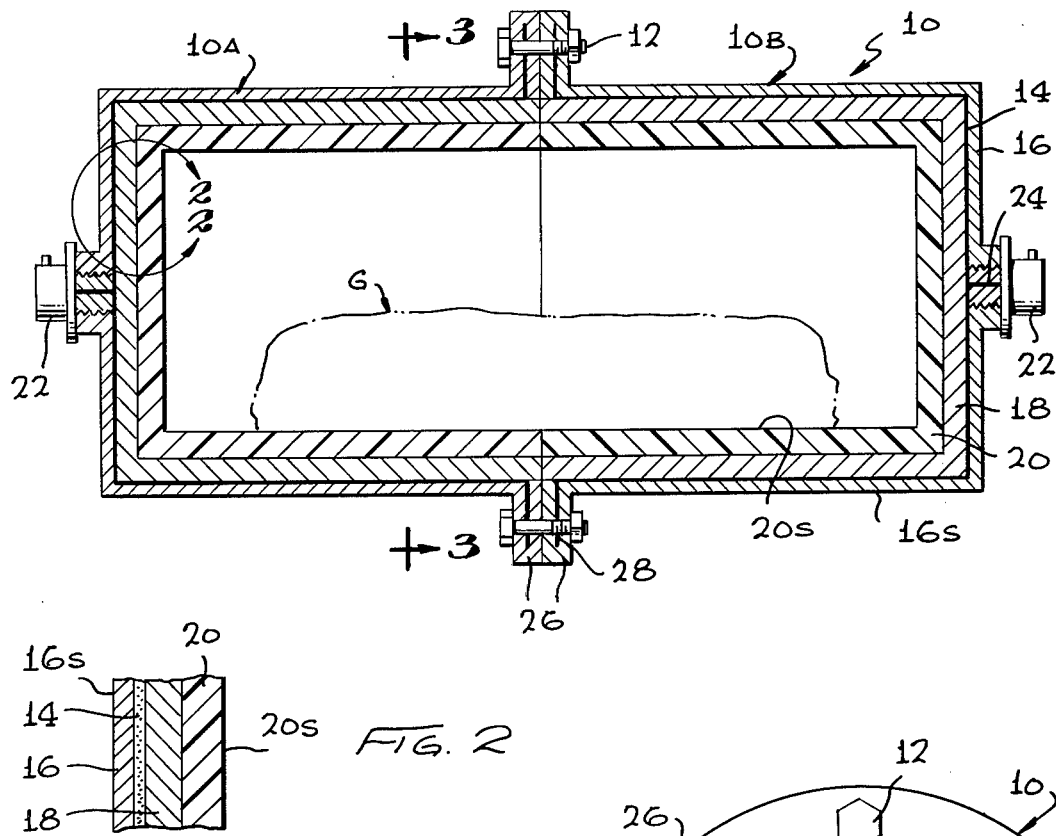
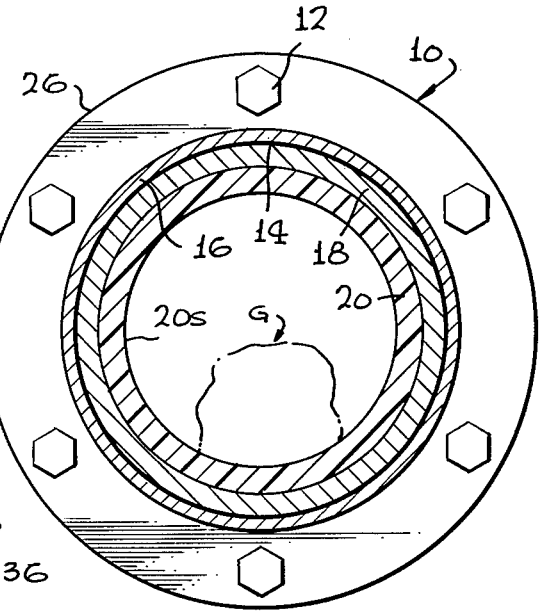
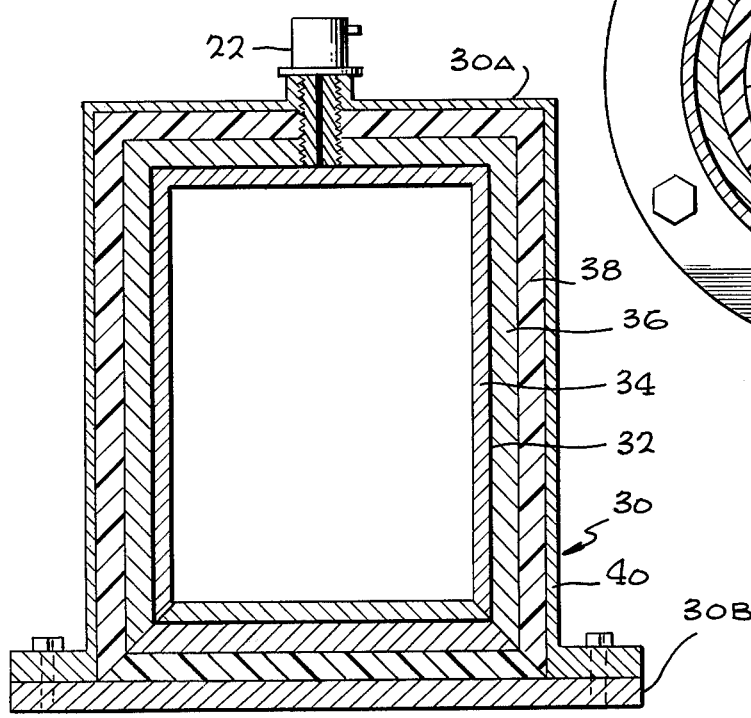

PORTABLE HEATABLE CONTAINER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

A portable, self heating container has important uses. For example, programs for exploration of the planets have required that precautions be taken to prevent any potentially hazardous organisms from contaminating the Earth between the time when the sample is brought to the Earth on a space vehicle and the time when the sample is brought to a control laboratory on the Earth. A container is required whose outer surface is sterilized at some point prior to entering the Earth's atmosphere, but without administering excessive heat to the contents of the container that would damage the enclosed specimen. Such a container must be efficient, of low weight, simple, and pose no hazard to the spacecraft. A similar type of container would be useful in passing a container into or out of a biologically hazardous laboratory (such as where recombinant DNA experiments are conducted).

A container which can heat the inside walls of the container and/or the contents therein, is also useful in a variety of situations, as in providing sterilizing facilities for field hospitals and other emergency situations, where a lightweight device is necessary which can rapidly apply high sterilizing temperatures.

SUMMARY OF THE INVENTION

In accordance with one embodiment of the invention, a container is provided which can apply considerable heat, and yet which is of low weight and simple design. The container includes a layer of a combustible charge such as thermit type pyrotechnic which is held between a pair of container walls that can withstand at least moderately high temperatures, and with the combustible material extending around substantially the entire container in a thin layer. When the combustible material is ignited, it generates considerable heat, which can sterilize the outside of the container, the inside of the container, or the contents of the container, depending on the construction of the container.

In one container structure wherein the outside of the container must be sterilized without excessively heating the contents of the container, the thermit-type charge lies between a thin outer casing and a thicker structural and buffer layer, and an insulative layer is provided within the structural layer. The thickness of the thermit-type layer is chosen so that it produces sufficient heat to heat the thin casing to a moderately high temperature, so that all outer surface portions are heated to at least 230° C. to assure destruction of all potential microorganisms, and yet to not create so much heat as to melt the thin outer casing. The structural layer lying within the thermit-type charge is thick enough to absorb considerable amounts of heat to avoid reaching a very high temperature, and the insulator serves to minimize the transfer of heat to the contents of the container so that the inner walls of the container are maintained at a temperature below 100° C.

In another container, the thermit-type layer lies near a thin inside casing or wall of the container to heat it, so as to sterilize the inside of the container and/or heat the contents of the container.

The novel features of the invention are set forth with particularity in the appended claims. The invention will be best understood from the following description when read in conjunction with the accompanying drawings.

BRIEF DESCRIPTION OF THE DRAWINGS

FIG. 1 is a sectional view of a container constructed in accordance with one embodiment of the present invention.

FIG. 2 is an enlarged view of the area 2—2 of FIG. 1.

FIG. 3 is a view taken on the line 3—3 of FIG. 1.

FIG. 4 is a sectional side view of a container constructed in accordance with another embodiment of the invention.

BRIEF DESCRIPTION OF THE DRAWINGS

FIG. 1 illustrates a cannister or container 10 which is designed to hold a specimen or other goods G, and to sterilize its exterior surface without excessively heating the goods. The particular container is designed to avoid contamination of the Earth by any microorganisms on the container, when it is used to bring a specimen from another planet to the Earth and then to a secured laboratory where the container can be opened and the specimen examined. The outside of the container must be heated to a considerable temperature such as above 230° C. at every location of the outside surface, without heating the goods to 100° C.

The container includes two similar parts 10A, 10B that are bolted together by fasteners 12. Each container half includes a substantially uniformly thin layer of combustible material 14 such as thermit-type pyrotechnic which can react and self-sustainedly create heat without the need for additional oxygen or the like. A thin casing 16 surrounds the thermit layer and forms the outside of the container. A structural-buffer member or layer 18 in the form of a container lies within the thermit-type material 14, and an insulator 20 lies within the structural layer. An electrical squib igniter 22 is utilized to ignite a small quantity of pyrotechnic powder 24, which secondarily ignites the thermit-type layer 14.

As the combustible layer 14 reacts, it creates heat which is transferred to the casing 16 and structural layer 18 that lie on opposite sides of the combustible layer. The heat raises the temperature of all portions of the casing surface 16s to a moderately high temperature such as above 230° C. for all surface areas of the casing for a short period of time, typically several minutes, to destroy any microorganisms on the casing surface. The thickness of the combustible layer 14, in relation to the heat capacity of the casing 16, is chosen so that the casing 16 will be heated to the required temperature, but not to such a high temperature that it will melt. Of course, about half of the heat generated by the ignited combustible layer 14 will be applied to the structural layer 18 to raise its temperature. However, the structural layer 18 is designed to have a greater heat capacity than the thin casing 16, so that the structural layer 18 will not be heated to as high a temperature as the casing. The insulator layer 20 is also provided to minimize the amount of heat transfer from the structural layer 18 to the inner surface 20s of the container and the goods G within the container. Instead, after the combustible layer 14 has been fully combusted to raise the temperature of the casing 16, and after the temperature of the casing 16 then drops, much of the heat from the structural layer 18 will be transferred into the interior of the cannister. The thin casing will soon drop in temperature after having been raised to the sterilizing temperature, so that heat from inner parts of the container can be conducted out to the environment. Thus, the amount of the heating of the inside of the container is minimized by conducting heat away from the cannister and by distributing the limited amount of heat generated by the combustible layer to the large heat capacity structure formed by the structural member 18 and the insulator 20.

In order to facilitate the opening and closing of the container, the casing 16 is provided with a pair of flanges 26 which can be bolted together. Each of the flanges is formed with a groove 28 that is filled with the combustible charge 14, to heat the flange and the fastener 12 thereon to assure sufficient heating of the flanges to raise them to the required temperature. The two halves 10A, 10B of the container can be identical, with both of them formed to receive a squib 22 and with the two squibs being initiated simultaneously.

A container of the type shown in FIG. 1 can be constructed using aluminum for the casing 16 and structural layer 18, to minimize the weight of the container. The container was designed with an aluminum casing 16 of one-eighth inch thickness, a combustible layer 14 of thermit (a mixture of finely divided metallic zirconium and one or more oxides such as barium chromate or iron oxide) of a substantially uniform thickness of about two millimeters or about 0.080 inch, an aluminum structural layer 18 of one-quarter inch thickness, and a Teflon (or rubber, formed plastic, glass, etc.) insulative layer 20 of one-quarter inch thickness. The outside diameter of the container was about four inches and the height was about one foot so that the combustible portion at the end of the container had a diameter or length and width of much more than ten times its thickness (actually, about fifty times its thickness). The combustible layer portion 14w at the side walls of the container, had a circumferential length of about one foot, which is also much more than ten times the thickness of the layer.

The container can be formed using aluminum tubing, and the thermit-type powder can be poured into the container space between the casing 16 and structural layer 18 and compacted using an arc-shaped tamper just slightly thinner than the annular space. The ends of the cylindrical container can be formed by merely laying layers of the material on one another and welding them to the cylindrical container portions, the flanges 26 being similarly welded in place.

The combustible layer 14 is preferably constructed of a composition which reacts without the significant release of gas, so that no venting is required. A propagation speed of the ignition will be on the order of 0.2 to 1.0 centimeters per second. It is estimated that the powder reacts in the temperature range of 800°–1,000° C. The pyrotechnic column 24 which connects the electrical squib to the thermit can be formed of a boron based pyrotechnic powder.

In many applications, heating of a container surface is necessary at the inside of the container rather than the outside. For example the inside of a container intended to carry a material which must not be contaminated may have to be first sterilized. Also, there are applications where the contents of a container must be heated, such as to sterilize instruments in a field hospital or to begin the operation of a fuel cell that must start at a high temperature. FIG. 4 illustrates a container 30 constructed in accordance with another embodiment of the invention, which can provide in-the-field heating at the inside of a portable container. The container 30 includes a combustible layer 32 of a thermit-type material which is trapped between a casing 34 forming the innner wall of the container, and a structural buffer layer 36 surrounding the combustible layer. An insulator layer 38 can be provided around the structural layer 36, and a protective outer layer 40 can be provided around the insulator. When the combustible layer 32 is ignited as by an electrically ignitible squib 22 and pyrotechnic column 24, the combustible layer creates heat which heats the inner casing 34. The heat can sterilize the inner casing where this is desired, and can heat goods lying within the inner casing where this is desired. Where only the casing needs to be heated, a thin thermit layer can be utilized. Where goods within the inner casing 32 must be heated, such as implements to be sterilized or a quantity of water to be turned into steam, a somewhat thicker layer of thermit-type material may be utilized. The casing 34 may be constructed of a very high temperature-resistant material such as stainless steel, to enable considerable heat transfer without melting. The surrounding structural layer 36 serves as a structure to hold the container together and as a heat-isolating buffer for absorbing heat from the thermit layer to minimize the temperature at which it and the insulating layer 38 is raised. The insulating layer 38 prevents the outside of the container from reaching a very high temperature.

The container 30 can be constructed with a cylindrical portion 30A and an end portion 30B, which can be easily assembled and disassembled. In many applications, the combustible layer 32 extends around substantially the entire container to completely sterilize the outer or inner surface thereof. However, where it is desired only to heat goods within the container, it is possible to utilize the thermit layer so it extends around only a portion of the container.

Thus, the invention provides a container of relatively simple design, and which can be highly portable, which can heat its outside or inside. Uniform distributed heating can be obtained by a thin layer of a combustible material such as a thermit-type pyrotechnic which can be held at one side by a casing that is to be heated by the thermit type charge layer. The thickness of the casing and of the thermit layer are chosen so that the casing is heated to the desired temperature but is not overheated. The casing is preferably constructed of a highly thermally conductive material such as aluminum or copper, so that a large portion of the heat generated by the combusted thermit type material is absorbed by the casing. Although a casing of steel can be utilized, a material of higher thermal conductivity than steel, such as aluminum or copper provides more effective transference of heat to the casing. The side of the combustible layer opposite the casing, can be formed of a thick layer of material which can withstand high temperatures, so that this layer will not be raised to as high a temperature as the casing. An insulative layer can lie on a side of the thick isolating layer which is opposite the thermit, so that the side (inside or outside) of the container opposite the casing is not excessively heated.

Although particular embodiments of the invention have been described and illustrated herein, it is recognized that modifications and variations may readily occur to those skilled in the art, and consequently it is intended that the claims be interpreted to cover such modifications and equivalents.

What is claimed is:

1. A cannister apparatus which can self sterilize its outside surface while avoiding excessive heating of goods within the cannister, comprising:
    walls forming a container for surrounding the goods;
    a layer of combustible material surrounding said container walls to lie over substantially all areas of said container; and
    a layer of insulation lying within said container to insulate the goods from heat generated by the combustible material.

2. A cannister apparatus which can self sterilize its outside surface while avoiding excessive heating of goods within the cannister, comprising:
    walls forming a container for surrounding the goods;
    a layer of combustible material surrounding said container walls to lie over substantially all areas of said container, and
    a casing surrounding said container but spaced therefrom, said combustible material lying in the space between said container and casing, and said combustible material being of a type and thickness to heat the outside of said casing to at least about 230° C. to sterilize it.

* * * * *